T. L. CARTER.
FERTILIZER DISTRIBUTER AND PLANTER.
APPLICATION FILED JUNE 5, 1911.

1,004,365.

Patented Sept. 26, 1911.
2 SHEETS—SHEET 1.

Witnesses

Inventor
T. L. Carter
by H. B. Willson &co.
Attorneys

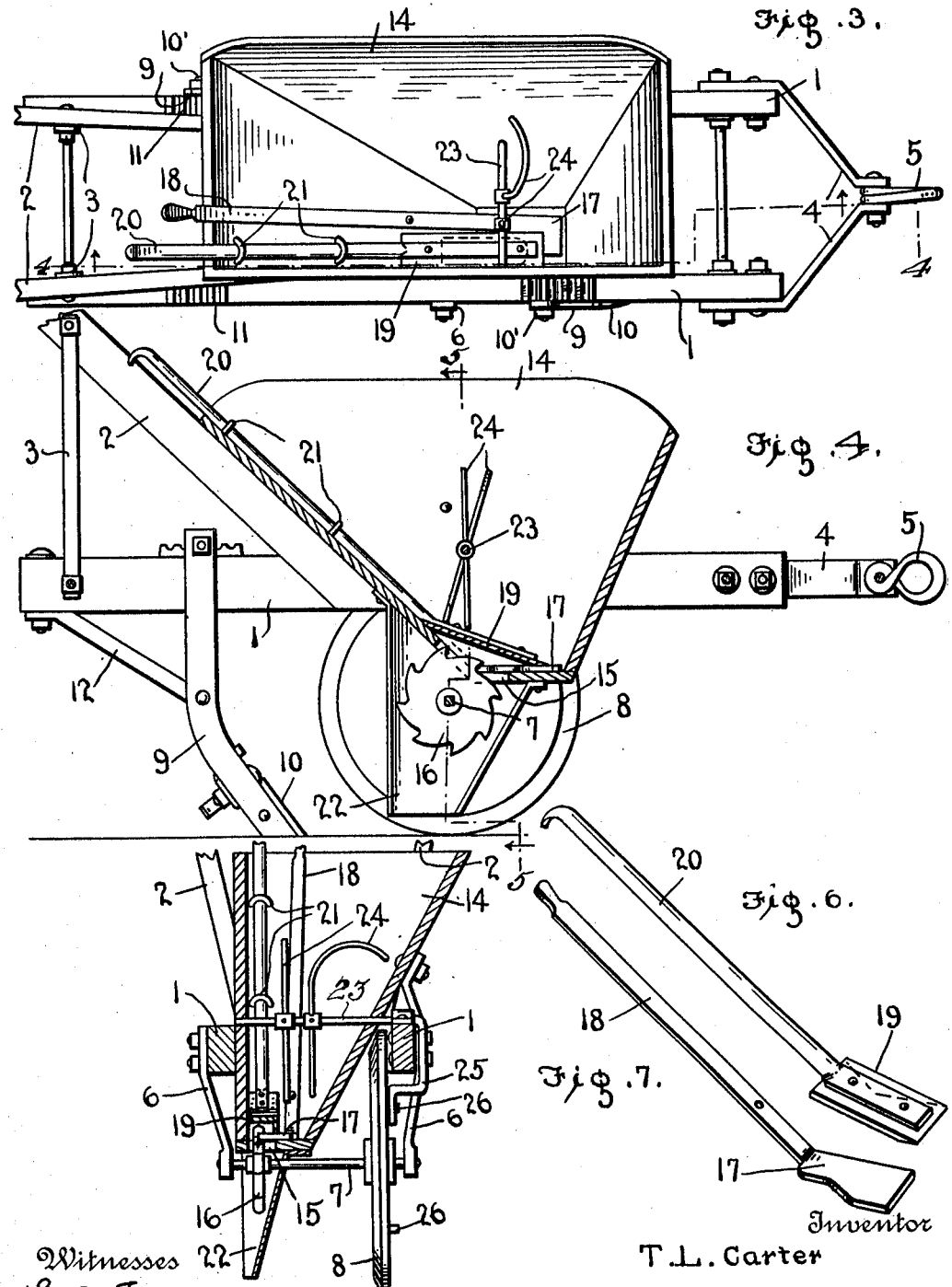

UNITED STATES PATENT OFFICE.

THOMAS L. CARTER, OF GREENVILLE, SOUTH CAROLINA.

FERTILIZER-DISTRIBUTER AND PLANTER.

1,004,365.   Specification of Letters Patent.   Patented Sept. 26, 1911.

Application filed June 5, 1911. Serial No. 631,250.

*To all whom it may concern:*

Be it known that I, THOMAS L. CARTER, a citizen of the United States, residing at Greenville, in the county of Greenville and State of South Carolina, have invented certain new and useful Improvements in Fertilizer-Distributers and Planters; and I do declare the following to be a full, clear, and exact description of the invention, such as will enable others skilled in the art to which it appertains to make and use the same.

This invention relates to improvements in fertilizer distributers and planters.

One object of the invention is to provide a fertilizer distributer and planter having an improved construction and arrangement of feed controlling mechanism whereby the feeding of the fertilizer and seed from the hopper is controlled.

Another object is to provide a machine of this character which will be simple, strong and durable in construction, efficient and reliable in operation and well adapted to the purpose for which it is designed.

With these and other objects in view, the invention consists of certain novel features of construction, combination and arrangement of parts as will be more fully described and claimed.

Figure 1:
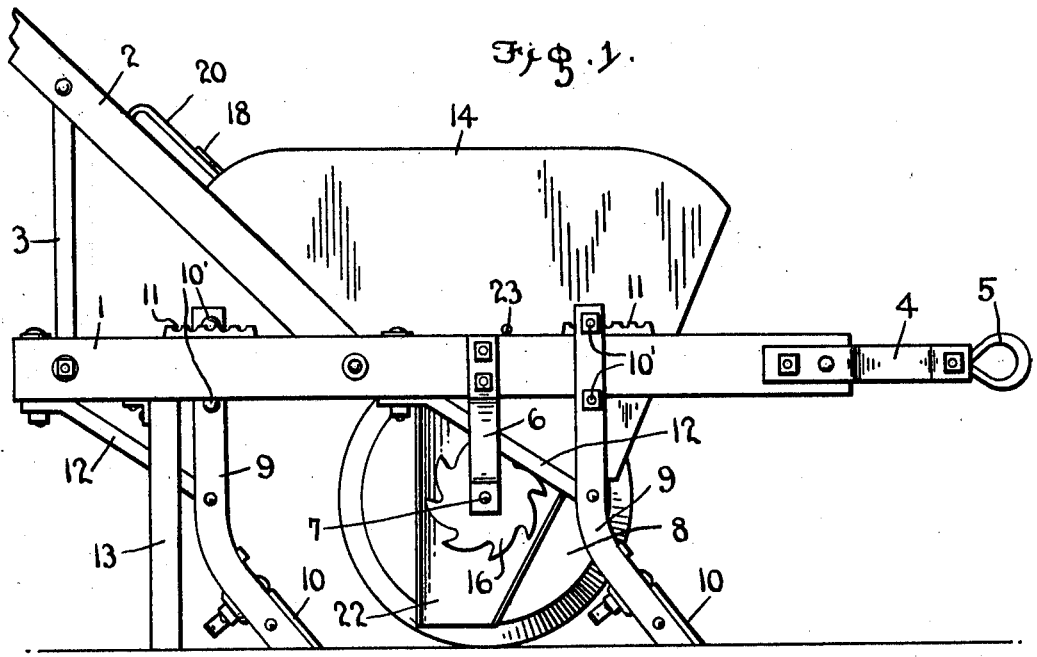
Figure 2:
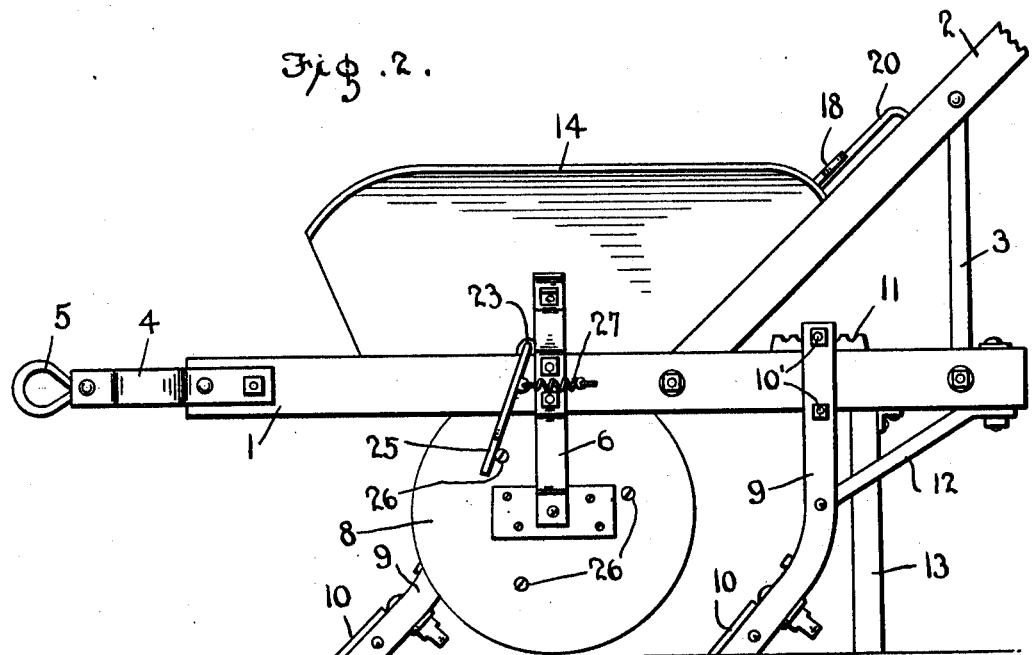

In the accompanying drawings: Figure 1 is a side view of one side of my improved fertilizer distributer; Fig. 2 is a similar view of the opposite side; Fig. 3 is a top plan view; Fig. 4 is a vertical longitudinal section on the line 4—4 of Fig. 3; Fig. 5 is a vertical cross section through the hopper and beams on the line 5—5 of Fig. 4 the included parts being shown in elevation: Figs. 6 and 7 are respectively detail views of the feed regulating and controlling valves.

My improved fertilizer distributer and seed planter comprises a pair of parallel longitudinally disposed beams 1 to which are connected rearwardly extending handles 2, supported by brace bars 3 connected thereto and to the beams 1 as shown. The forward ends of the beams 1 are connected together by draft bars 4 to which is secured a suitable clevis 5.

Secured to the outer sides of the beams 1 substantially midway between their ends are downwardly projecting bearing bars 6 in the lower ends of which is revolubly mounted the shaft 7 of a supporting and operating wheel 8.

To one of the beams 1 near its forward end and to the other beam near its rear end are attached the standards 9 of cultivating plows or shovels 10. The standards 9 are preferably bifurcated and straddle the beams 1 as shown. The parts of the bifurcated standards of the beams are bolted together above and below the beams by clamping bolts 10′ whereby said standards are securely fastened to the beams. The upper clamping bolts 10′ are adapted to engage racks 11 secured to the upper edges of the beams between the upper bifurcated ends of the standards, said racks thus holding the standards against forward and backward movement when clamped to the beams. The standards 9 are further secured in position by inclined brace bars 12 which are secured thereto and to the bottoms of the beams as shown. To the rear end of the beam carrying the forward cultivating plow or shovel is preferably secured a supporting leg 13 whereby the machine is held in an upright position when not in use.

Supported between the beams 1 and on the lower portions of the handle bars is a hopper 14 the ends and sides of which incline from the top to the bottom. In the rear side of the hopper adjacent to the bottom thereof and partially in the bottom is a feed opening 15 through which a toothed feed wheel 16 projects, the teeth of which draw the fertilizer or seed through the said opening. The feed wheel 16 is fixed on the shaft 7 and is thereby operated when the machine is drawn over the ground. In order to control the amount of seed or fertilizer discharged by the feed wheel I provide a feed regulating valve comprising a plate 17 which closely engages the bottom of the hopper and is carried by the lower end of an operating lever or handle 18 which is pivoted to the rear wall of the hopper and extends upwardly beyond the upper end thereof whereby it may be grasped and operated to shift the plate 17 across the discharge opening in the bottom of the hopper and thus close said opening to a greater or less extent. It will be noted that one edge of the plate 17 is cut away to permit the same to fit around the portion of the feed wheel projecting into the hopper. In addition to the feed controlling valve 17 I also preferably provide a cut off valve 19 comprising a plate arranged at an angle on the lower end of an operating bar 20, above the feed wheel, which bar is slidably secured to the rear side of the hopper by suitable guide clips 21 whereby, when said bar 20 is pushed down or pulled up, the cut off plate 19 will be adjusted to cover the feed passage and feed wheel and thus prevent the seed or fertilizer being discharged from the hopper. Secured to one side of the bottom of the hopper is a depending feed chute 22 which directs the fertilizer and seed discharged from the hopper down into the furrow opened by the forward plow or shovel 10.

Revolubly mounted in the central portion of the hopper is an agitator shaft 23 on which is fixedly mounted a series of radially projecting agitating fingers 24. One end of the shaft 23 projects beyond the adjacent side of the hopper and is bent at right angles thence inwardly and downwardly to form a right angularly disposed trip arm 25 which is adapted to be engaged by trip pins or tappets 26 arranged in and projecting laterally from the adjacent side of the wheel 8 whereby as said wheel is revolved the shaft will be rocked in one direction, said shaft being swung back in the opposite direction by means of a spring 27 which is connected to the trip arm 25 and to the side of the adjacent beam 1 as shown. By thus operating the agitator shaft and arms the fertilizer or seed in the hopper will be prevented from packing or stopping up the lower end of the hopper.

By means of a fertilizer distributer and planter constructed as herein shown and described it will be seen that various kinds of seed may be readily planted and in the desired quantities and that fertilizer may be freely distributed and the distribution thereof controlled.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention, what I claim is:

In a combined fertilizer distributer and planter, a pair of supporting beams, cultivating plows secured to said beams, a supporting and operating wheel, a leg adapted to support the machine, a hopper secured to said beams, said hopper having in its lower end a discharge opening, a feed regulating valve, means to shift said valve and thereby open and close the discharge opening to a greater or less extent, a cut off valve adapted to be shifted to cover said opening and thereby prevent the discharge of seed or fertilizer from the hopper, means whereby said valve is operated, a feed wheel fixedly mounted on the shaft of said supporting and operating wheel whereby said feed wheel is operated to feed the material to the discharge opening in the hopper, an agitating shaft revolubly mounted in the hopper, agitating arms arranged on said shaft, a trip arm formed on the outer end of said shaft, trip pins arranged in one side of said supporting and operating wheel and adapted to successively engage the trip arm on said agitating shaft whereby the latter and the agitating fingers thereon are rocked in one direction, and a spring to rock said shaft in the opposite direction.

In testimony whereof I have hereunto set my hand in presence of two subscribing witnesses.

THOMAS L. CARTER.

Witnesses:
  W. R. Cely,
  W. L. Gassaway.

Copies of this patent may be obtained for five cents each, by addressing the "Commissioner of Patents, Washington, D. C."